United States Patent [19]

Pasierb, Jr. et al.

[11] 4,398,189
[45] Aug. 9, 1983

[54] LINE BUFFER SYSTEM FOR DISPLAYING MULTIPLE IMAGES IN A VIDEO GAME

[75] Inventors: John J. Pasierb, Jr., Schaumburg; Atish Ghosh, Glendale Heights, both of Ill.

[73] Assignee: Bally Manufacturing Corporation, Chicago, Ill.

[21] Appl. No.: 294,438

[22] Filed: Aug. 20, 1981

[51] Int. Cl.$^3$ .............................................. G09G 1/16
[52] U.S. Cl. ........................... 340/721; 273/DIG. 28; 340/725; 340/744; 340/799
[58] Field of Search ............... 340/701, 703, 721, 725, 340/727, 744, 799; 273/DIG. 28

[56] References Cited

U.S. PATENT DOCUMENTS

| | | | |
|---|---|---|---|
| 4,070,710 | 1/1978 | Sukonick et al. | 340/744 X |
| 4,112,422 | 9/1978 | Mayer et al. | 320/324 AD |
| 4,116,444 | 9/1978 | Mayer et al. | 273/101.2 |
| 4,177,462 | 12/1979 | Chung | 340/703 |
| 4,225,929 | 9/1980 | Ikeda | 340/727 X |

OTHER PUBLICATIONS

*Midway's Galaxian Trouble Shooting Logic Board, Part I,* Franklin Park, Ill., Midway Mfg. Co., 1980, p. 13.
*Midway's Pac-Man Parts and Operating Manual,* Franklin Park, Ill, Midway Mfg. Co., 1980, p. 32.

Giloi, W. K., *Interactive Computer Graphics,* Englewood Cliffs, N.J., Prentice-Hall, 1978, Ch. 7.
Newman, W. M. and Sproull, R. F., *Principles of Interactive Computer Graphics,* N.Y., McGraw-Hill, 1979, Ch. 26.

Primary Examiner—David L. Trafton
Attorney, Agent, or Firm—Welsh & Katz

[57] ABSTRACT

A line buffer system can display a large number of objects and a background in connection with the play of a video-type game. The system may be used with a microprocessor. Game data is transmitted from the microprocessor during a brief "handshake" operation which may occur at any time. The game data specifies the objects and background to be presented and the screen location of each. The objects and background, respectively, are stored as rectangular blocks in two memories. At least two buffers are provided, each buffer capable of storing data to represent one line of the picture. The system operates upon the game data to load the buffers in real time during picture drawing and just prior to picture drawing. One buffer then outputs a data stream to provide real time control of the drawing of one line of a picture. A flip feature provides for inverting any object or an entire picture about a vertical or horizontal axis, or both.

15 Claims 20 Drawing Figures

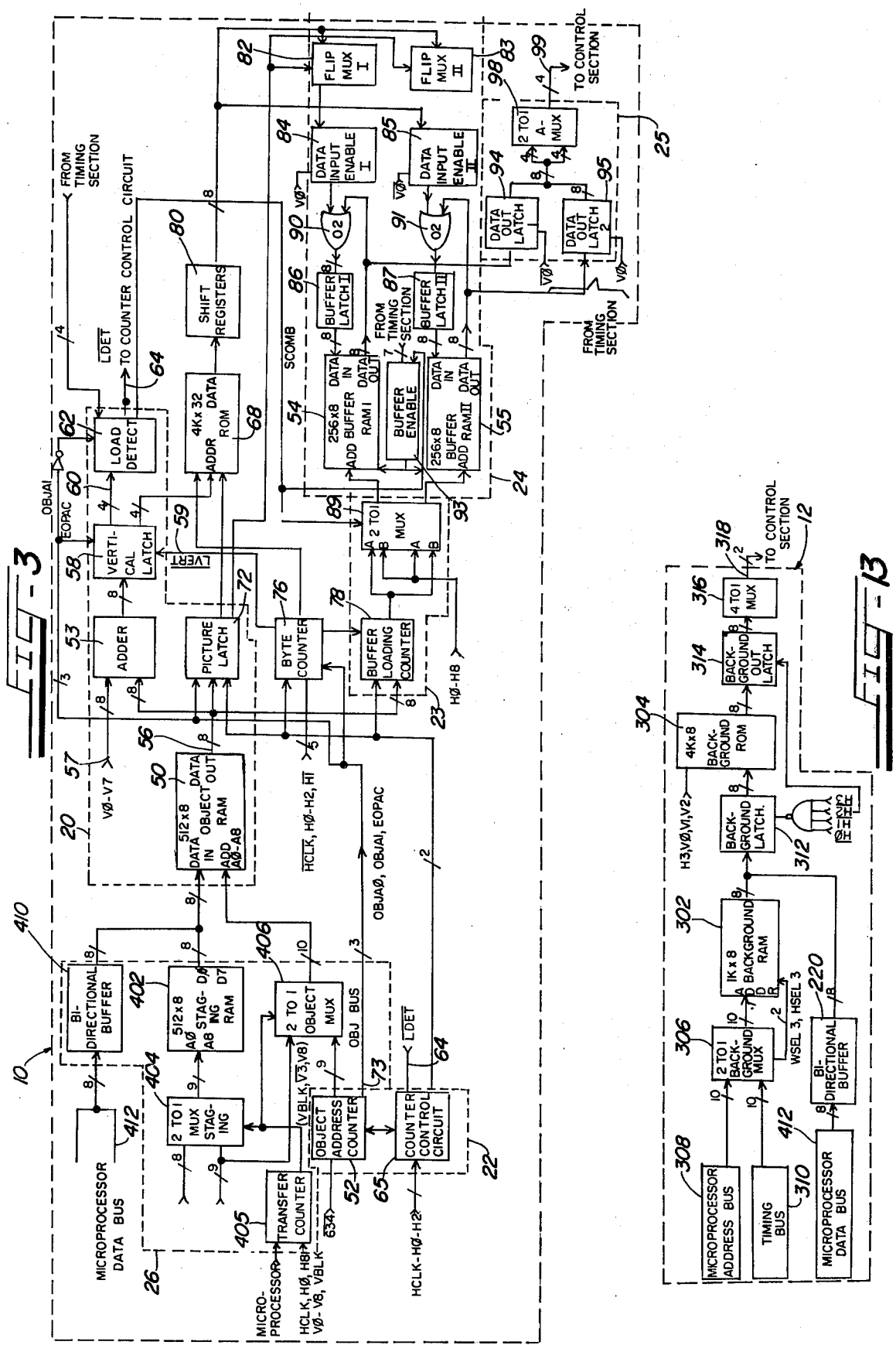

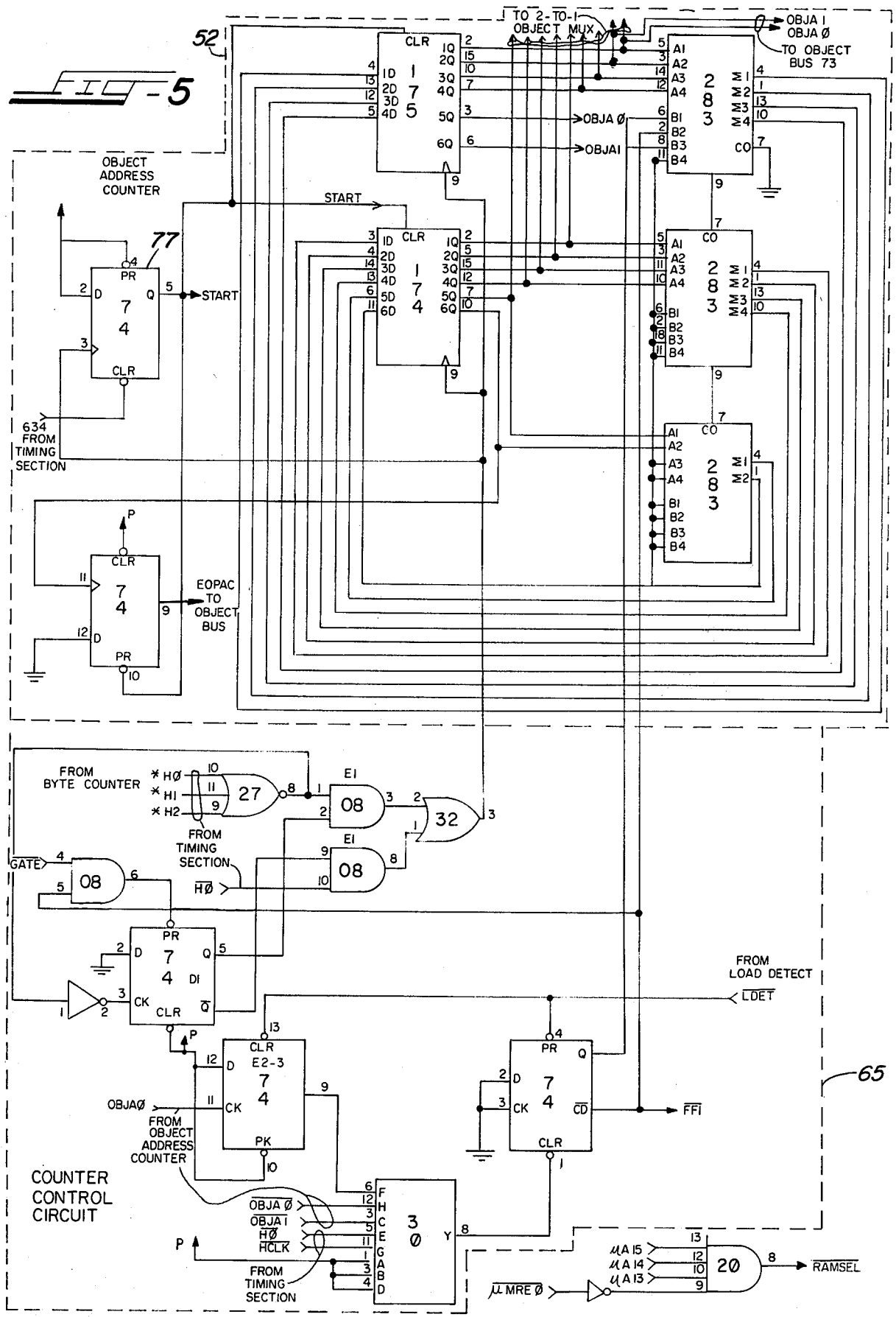

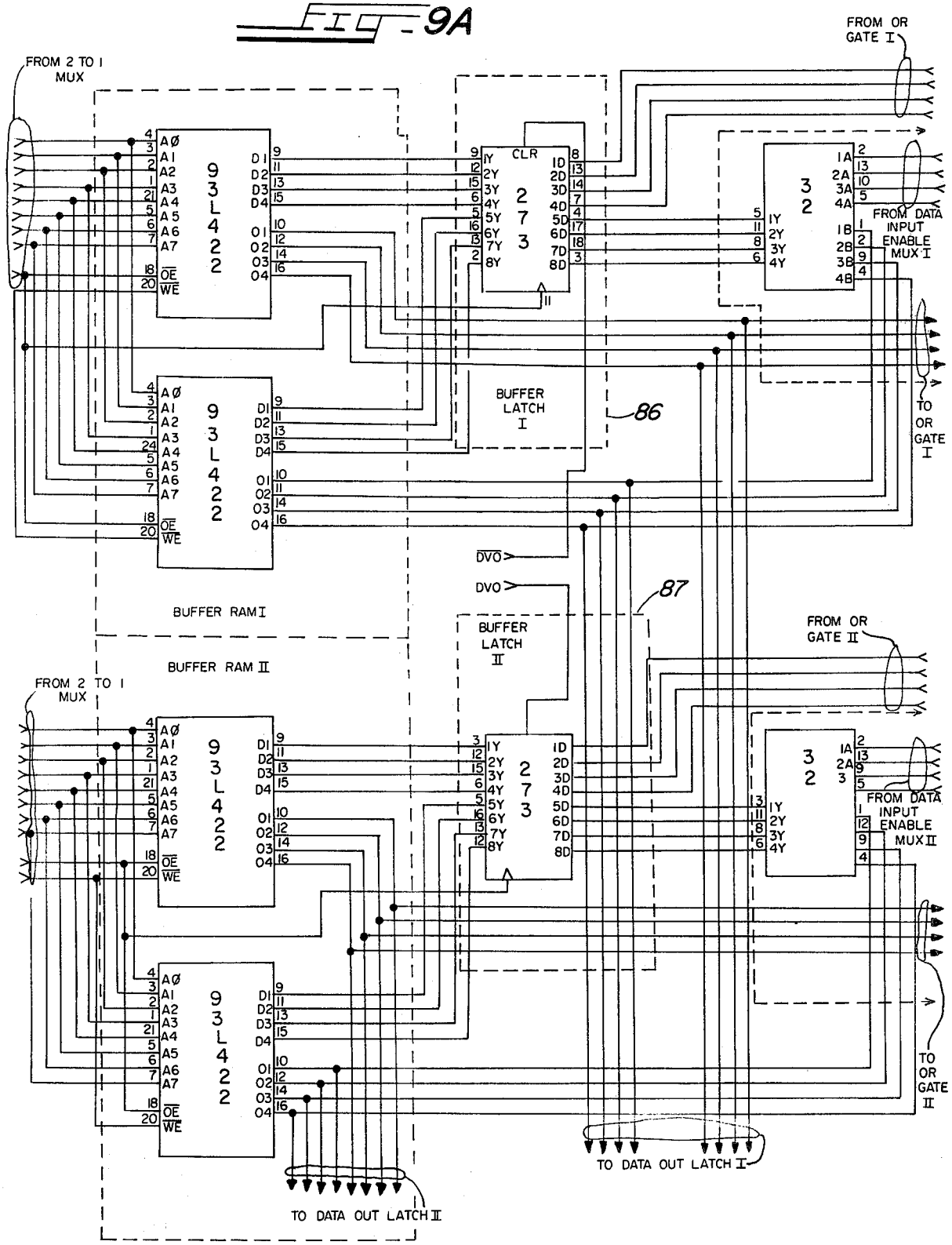

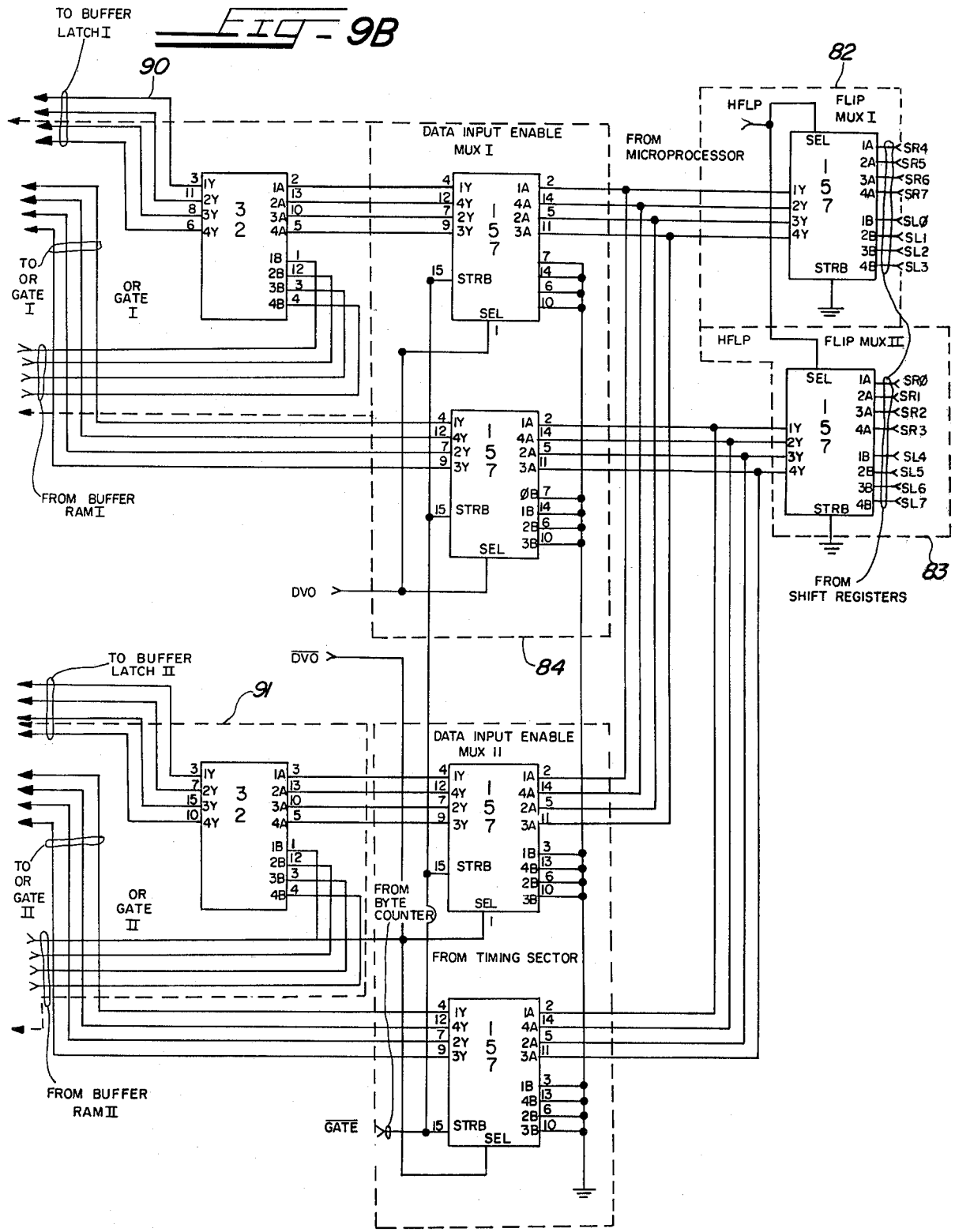

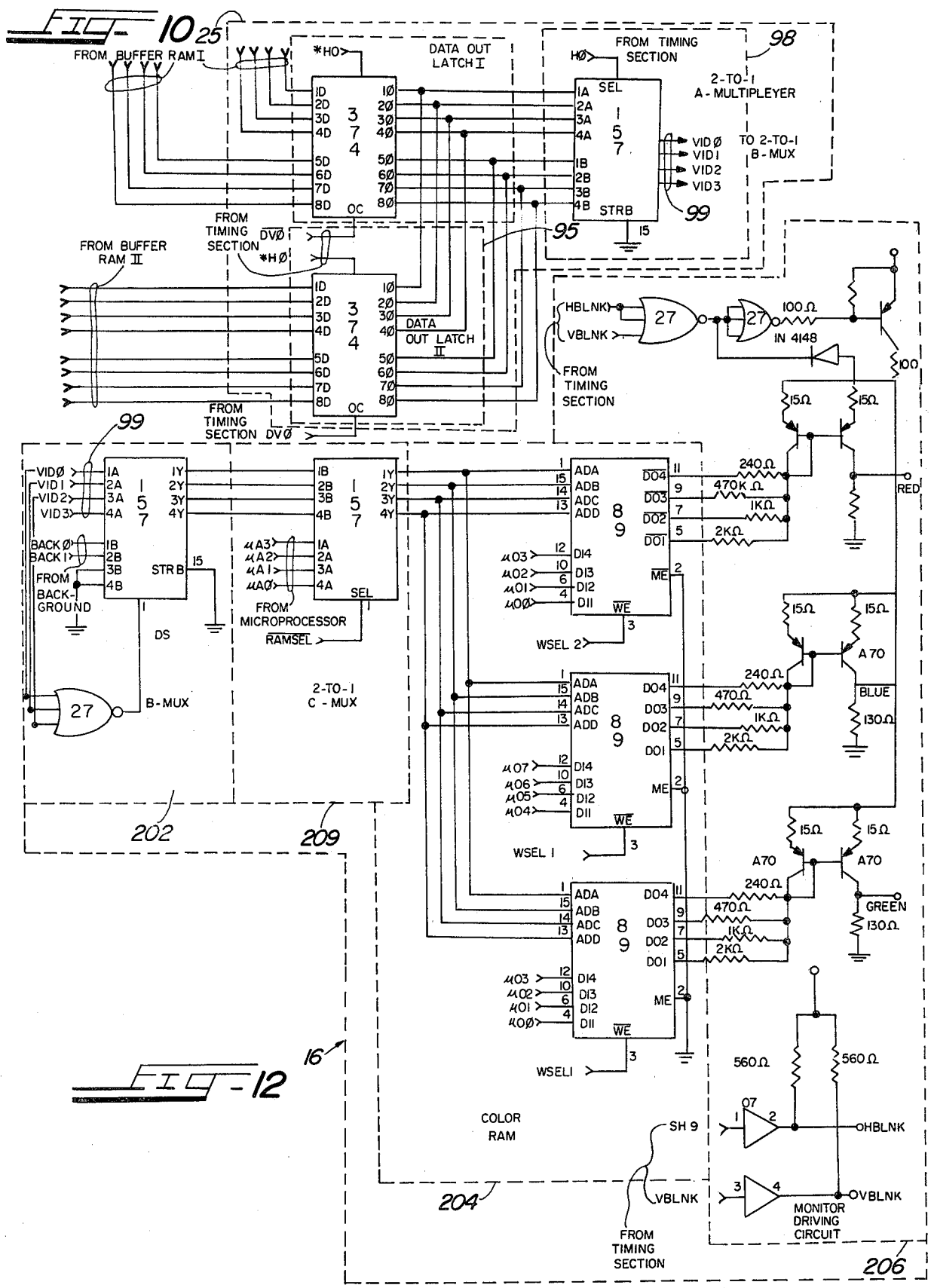

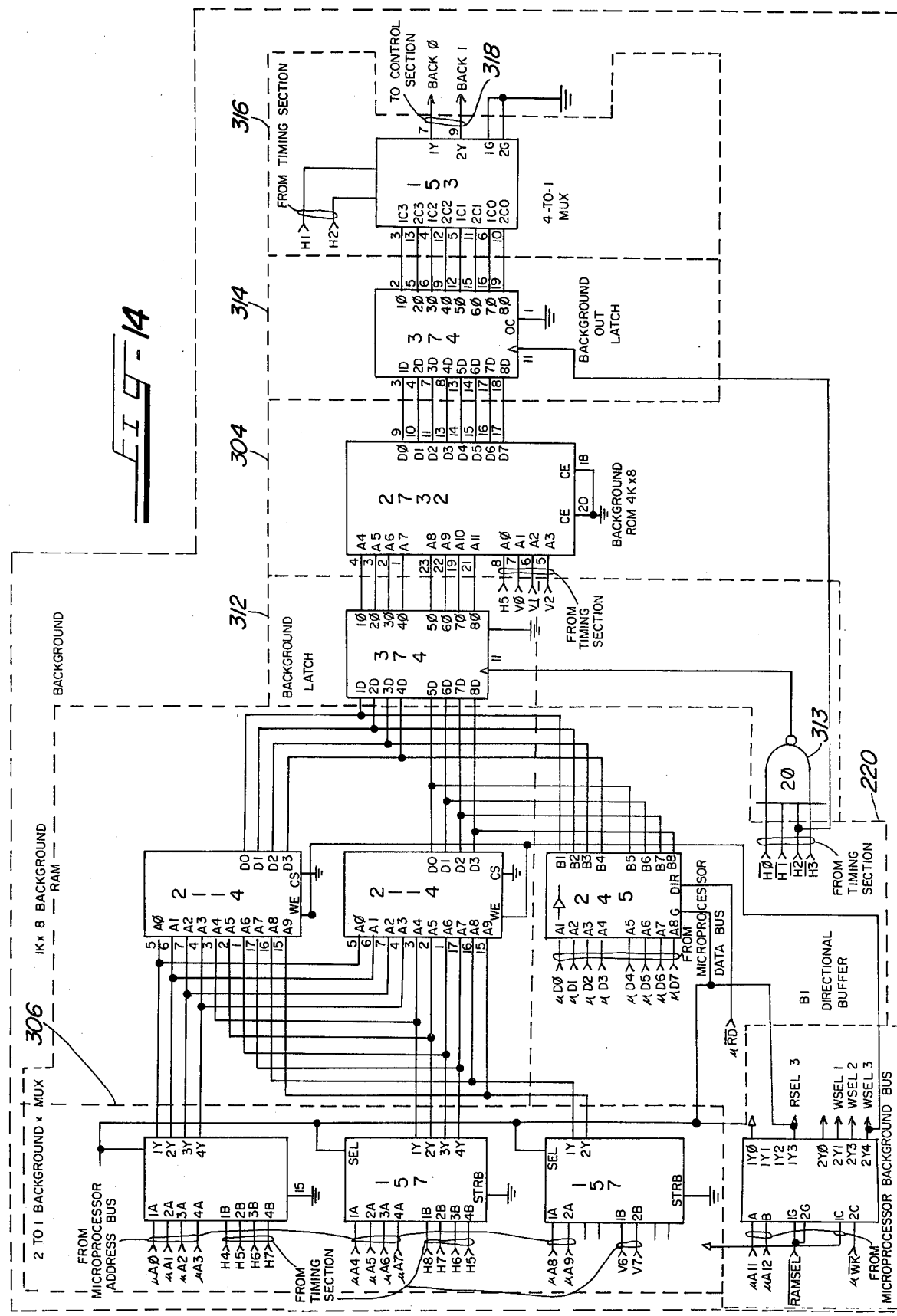

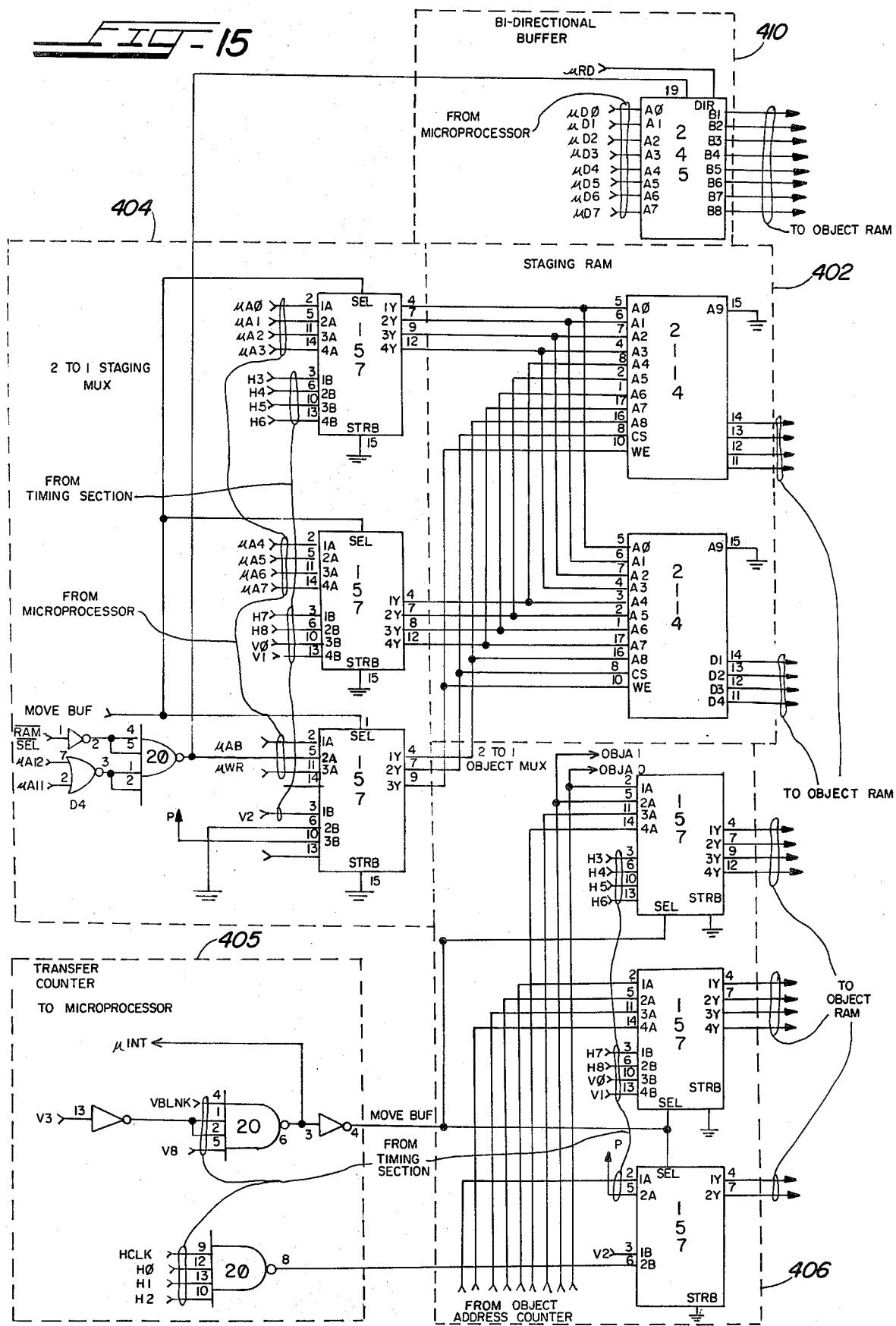

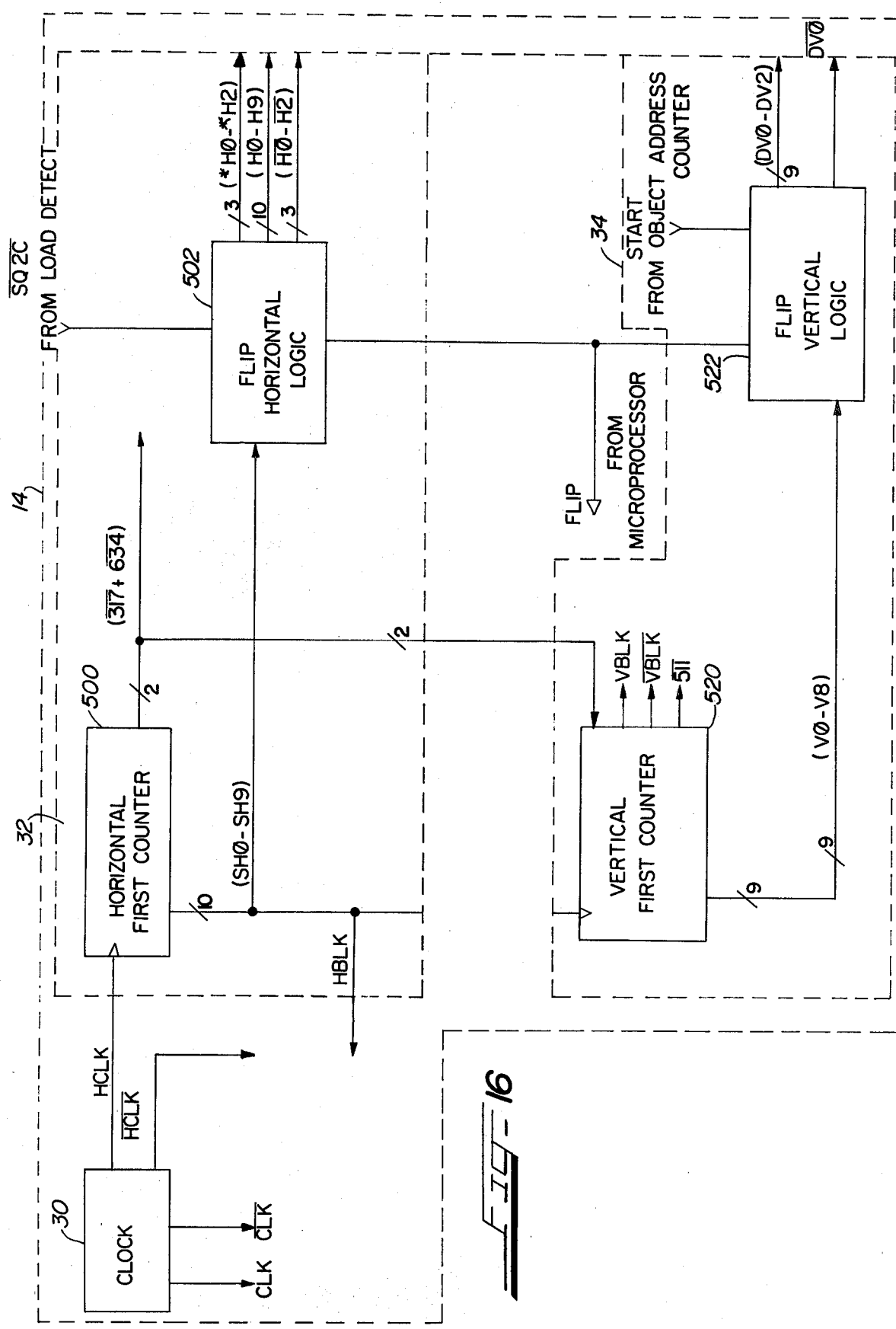

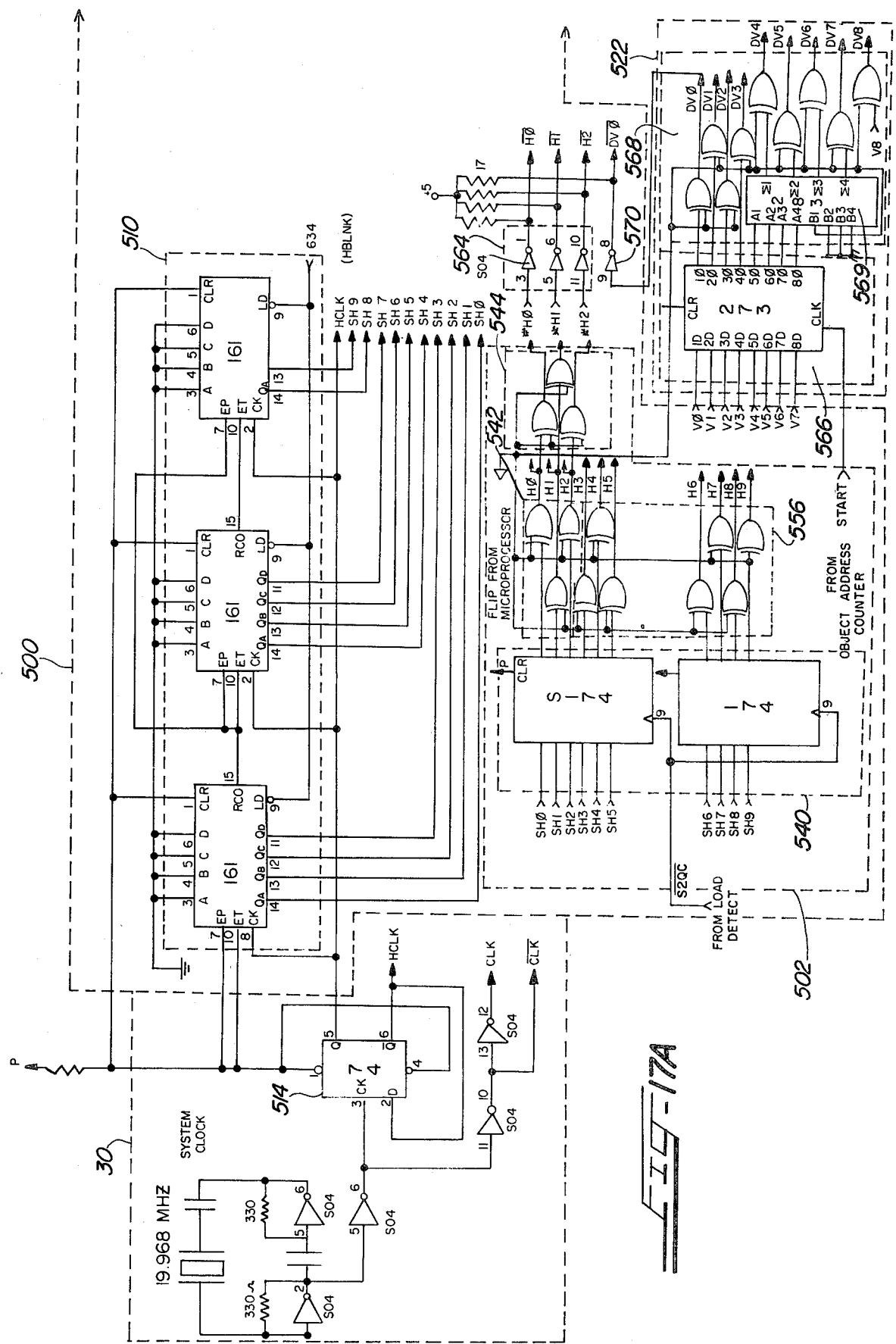

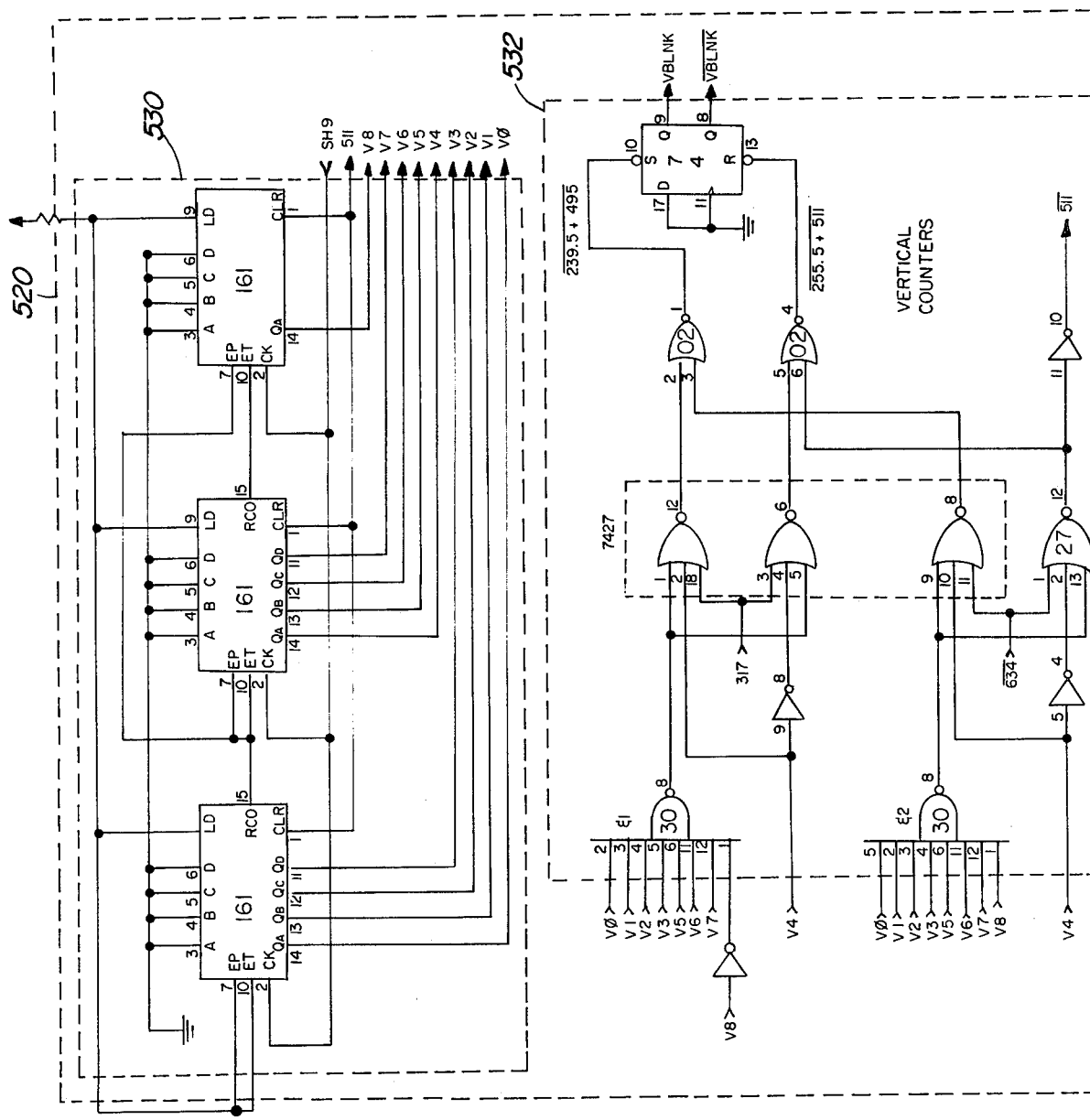
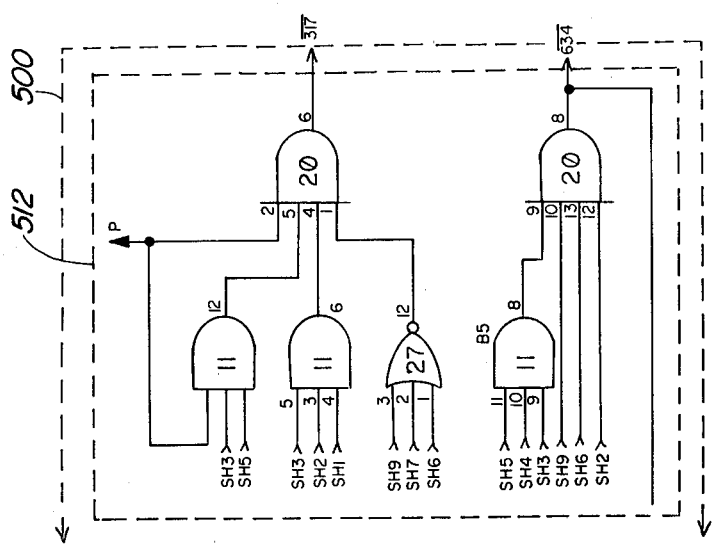
FIG-17B

LINE BUFFER SYSTEM FOR DISPLAYING MULTIPLE IMAGES IN A VIDEO GAME

BACKGROUND OF THE INVENTION

This invention relates to the display of video images in the context of electronic video amusement games.

The growing sophistication of video games increasingly requires the display of large numbers of moving objects in a video display. Also, now that color monitors are commonly used, game displays require complex background patterns over which the moving objects move during game play.

Modern video games are frequently designed for microcomputer control. Currently available microcomputers have limited computational power which may readily be overwhelmed by the simultaneous demands of game calculations and display control. Such demands have in the past been met with the use of high speed general purpose computers. The high cost of such computers, however, makes their use impractical in commercially viable video games.

Recent developments in the video game art have been directed to the design of hardware that tends to relieve the game microcomputer from its display control responsibilities. The game microcomputer is then available for game associated computations to the extent that it can delegate the supervision and control of the game display to the display hardware. On the other hand, the display hardware "steals time" from the microcomputer to the extent that the hardware must communicate with the microcomputer and to the extent that the hardware requires microcomputer supervision.

One example of a proposed use of dedicated display hardware is provided by Mayer, et al., U.S. Pat. No. 4,112,422. In Mayer the microcomputer specifies to a separate display circuit the objects that are to be displayed and the display positions of the objects. The display circuit then generates a signal suitable for use by a home TV receiver utilizing counters which are activated when the display positions of the various objects are reached. The design requires one counter for each object to be displayed.

It is evident that the circuitry taught by Mayer, et al., necessarily increases in size, complexity, and expense as the number of objects displayed increases. The Mayer circuitry also requires that the microcomputer operate "in step" with the display circuitry. The display circuitry is not, therefore, substantially "transparent" to the microcomputer operations. The freedom of the microcomputer to perform game computations is also thereby severely limited.

Some of the disadvantages of Mayer, et al., might be obviated by the system of Chung, U.S. Pat. No. 4,177,462. Chung's display circuit utilizes display controllers which act upon data supplied by the microcomputer. Each controller is indicated as having the capability of controlling up to 16 objects and putting a substantially single color background between each pair of objects. The objects are displayed on the basis of data supplied by the microcomputer which must, in turn, interrogate the display circuitry to obtain some of the game computational logic from a replaceable cartridge ROM in the display circuitry.

Chung's display circuit, at best, gives the microcomputer only limited relief from duties that steal time that would otherwise be available for game-associated calculations. The microcomputer is required to be inactivated whenever communications occur between the microcomputer and the display circuitry. A further disadvantage of the Chung design is that it requires the use of content addressable memories which are special purpose devices and tend to be costly. It would be much more desirable for commercial reasons to build circuits using readily available low cost devices in the design of circuitry for arcade games.

SUMMARY OF THE INVENTION

A feature of a preferred embodiment of the present invention is the rapid composition of a single horizontal line of a picture on the basis of minimal information from the game microcomputer. The passing of information from the microcomputer to the display circuit may then be completed in a very short period of time by a quick "handshake" operation. Except during the handshake period, which may take place at any time during the display cycle, the microcomputer and display circuitry operate independently of each other.

The game display may have representations of objects to be displayed stored as blocks of digital data in a permanent memory means. Some of the blocks of data may be representations of a single object in a sequence of different orientations. Sequential presentation to a viewer of the different orientations in successive pictures would then provide an illusion of a single rotating object. Because of the flexibility of the display circuitry it is only necessary to store representations of rotations through a single quadrant. That is, the circuitry can display the 360° rotation of the point of an arrow about an axis if representations of the arrow pointing straight up, 90° to the right, and sufficient positions in between to give the illusion of smooth motion are contained in the permanent memory. The display circuitry is capable of inverting one or both orthogonal axes of presentation in order to generate the three remaining quadrants.

The circuitry may also utilize a permanent memory means to store background information in the form of blocks of digital data.

An embodiment of the invention provides means for determining which bits of data from the object, or foreground, memory means, and the background memory means are required for the composition of each horizontal line of a raster scan video display. Having made the determination, a transfer means then begins loading a buffer means with the digital data required by forthcoming horizontal lines. Loading of the buffer means begins just prior to the commencement of the display of a single picture and continues throughout the display of that picture. Meanwhile output means cause the buffer means to begin outputting a data stream for controlling the video presentation.

Control means are provided for controlling the picture on a color monitor using the information provided by the output data stream. The specific embodiments envisioned herein may utilize the data stream signals to control directly the voltages applied to the color and intensity terminals of a color gun in the monitor.

In a particular construction described herein, the buffer means comprises a pair of buffer memories which may be used for alternate lines. Thus, while one buffer is outputting a data stream for controlling the color monitor for the line currently being drawn on the video screen, the other buffer is being loaded with data for the following line. It is, of course, not a necessary feature of the invention that only two such buffers be used. An alternate construction may make use of a larger number of buffers or, for example, a dual-port memory. Considerations of speed and economy will often suggest the particular devices to be used to implement this invention at any particular stage of development of the electronics art.

It is accordingly an object of this invention to provide a display circuit and method which is substantially transparent to the game control microcomputer, thereby permitting the display circuitry and microcomputer to operate substantially independently of one another. It is a further object of this invention to provide a circuit and method capable of composing a high resolution picture showing a very large number of colored objects on a colored background on the basis of minimal instructions from a game-control microcomputer.

Another object of the present invention is to provide a simple and economical method for presenting and manipulating large numbers of objects on a video screen in the play of a game.

Another object of the invention is to provide a "flip" feature for a video screen display whereby a single picture or a single object may be inverted, or the mirror image of the picture or object presented, or both.

These and other objects, advantages, and features of the invention, as well as many of the particular advantages, will become readily apparent from the following detailed description of one specific construction of an embodiment which is presented in conjunction with the accompanying drawings.

BRIEF DESCRIPTION OF THE DRAWINGS

With reference to the accompanying three sheets of drawings:

FIG. 3 is a functional block diagram of the foreground generator shown as a block in FIG. 1.

FIG. 5 is a circuit diagram of a specific construction of the object control section shown as a logical subsection in FIG. 3.

FIGS. 9A and 9B are a circuit diagram of a specific construction of the buffer section shown as a logical subsection in FIG. 3.

FIG. 10 is a circuit diagram of a specific construction of the output section shown as a logical subsection in FIG. 3.

FIG. 12 is a circuit diagram of a specific construction of the central section shown as a functional block diagram in FIG. 11.

FIG. 13 is a functional block diagram of the background generator shown as a block in FIG. 1.

FIG. 14 is a circuit diagram of a specific construction of the background generator shown as a functional block diagram in FIG. 13.

FIG. 15 is a circuit diagram of a specific construction of the communication section shown as a logical subsection in FIG. 3.

FIG. 16 is a detailed functional block diagram of the timing section shown as a simplified schematic in FIG. 2.

FIGS. 17A and 17B show a circuit diagram of a specific construction of the timing section shown as a functional block diagram in FIG. 16.

DETAILED DESCRIPTION

Figure 1:
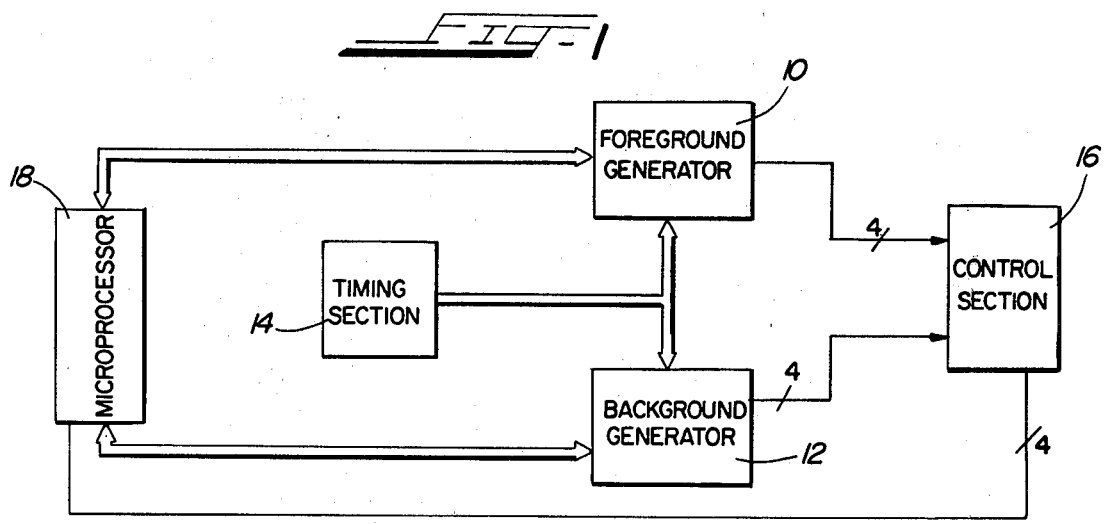
FIG. 1 is an overall functional block diagram of a specific construction of a preferred embodiment following the teachings of the present invention.

A specific construction of an embodiment of the present invention is a double line buffer for use with a raster scan color video monitor. FIG. 1 shows schematically the logical operation of the specific construction.

The double line buffer comprises a foreground generator 10 and a background generator 12. In the specific construction the foreground generator is block oriented and is also capable of displaying 128 individual, independent objects. The background generator is also block oriented and may display selections from 256 different blocks. Foreground and background ROM's providing permanent memory means within the respective generators are programmed with information to control the display. The foreground and background generators are controlled by a timing section 14. The generators output their data into a control section 16. A microprocessor 18 governs overall operation of the system.

The foreground generator contains two RAM buffers. Each RAM buffer is capable of holding information for one horizontal, or scan, line. The buffers work as complements of each other. One buffer alternately unloads its information to the screen on one scan line while the other buffer is loaded with the data for the next scan line. Each scan line is digitized by division into 512 "pixels."

The background for the system is made up of an array comprising blocks 32 pixels wide and 16 lines high. Each block can be individually specified by a programmer to be any one of the 256 available pictures.

The timing section 14 includes a system clock and counters. The system clock 30 runs a 10 bit horizontal counter 32, as shown in a simplified schematic, FIG. 2. The horizontal counter counts from 0 to 511 during active video scan and from 512 to 634 during horizontal retrace. "Active video scan" is the time during which a horizontal line is actually being traced on the monitor face.

When the horizontal counter 32 reaches a count of 634 the counter resets itself to zero. Each time a count of 512 is reached, a nine bit vertical counter 34 is incremented. Each horizontal count causes the monitor to draw one horizontal pixel on the screen, except during horizontal blanking, by means that will be described in connection with the "flip" features. Each vertical count commences the drawing of one horizontal line by means also to be described in connection with the "flip" feature, except during vertical blanking. Successive horizontal lines are drawn one below another, as the monitor is normally viewed.

The vertical counter starts at 0 and counts to 239 during active video. The video is blanked for retrace for 16 counts commencing with count 239.5, and a second active period starts on a count of 255.5. Blanking again occurs on count 495 for another 16 counts. On count 511 the vertical counter is reset to 0 and the cycle recurs. The half line count is obtained by detecting the 317th horizontal count.

The horizontal lines during the second active period, or trace, are interlaced between the lines drawn during the first active period. The first trace thereby draws a field of the odd numbered lines; the second trace draws a field of the even numbered lines. The two interlaced fields or traces together comprise a single "frame" or "picture." The display resolution will be 512 pixels per horizontal line and there will be 479 interlaced lines.

A more detailed exposition of the timing section will be given in connection with the "flip" feature.

Figure 4A:
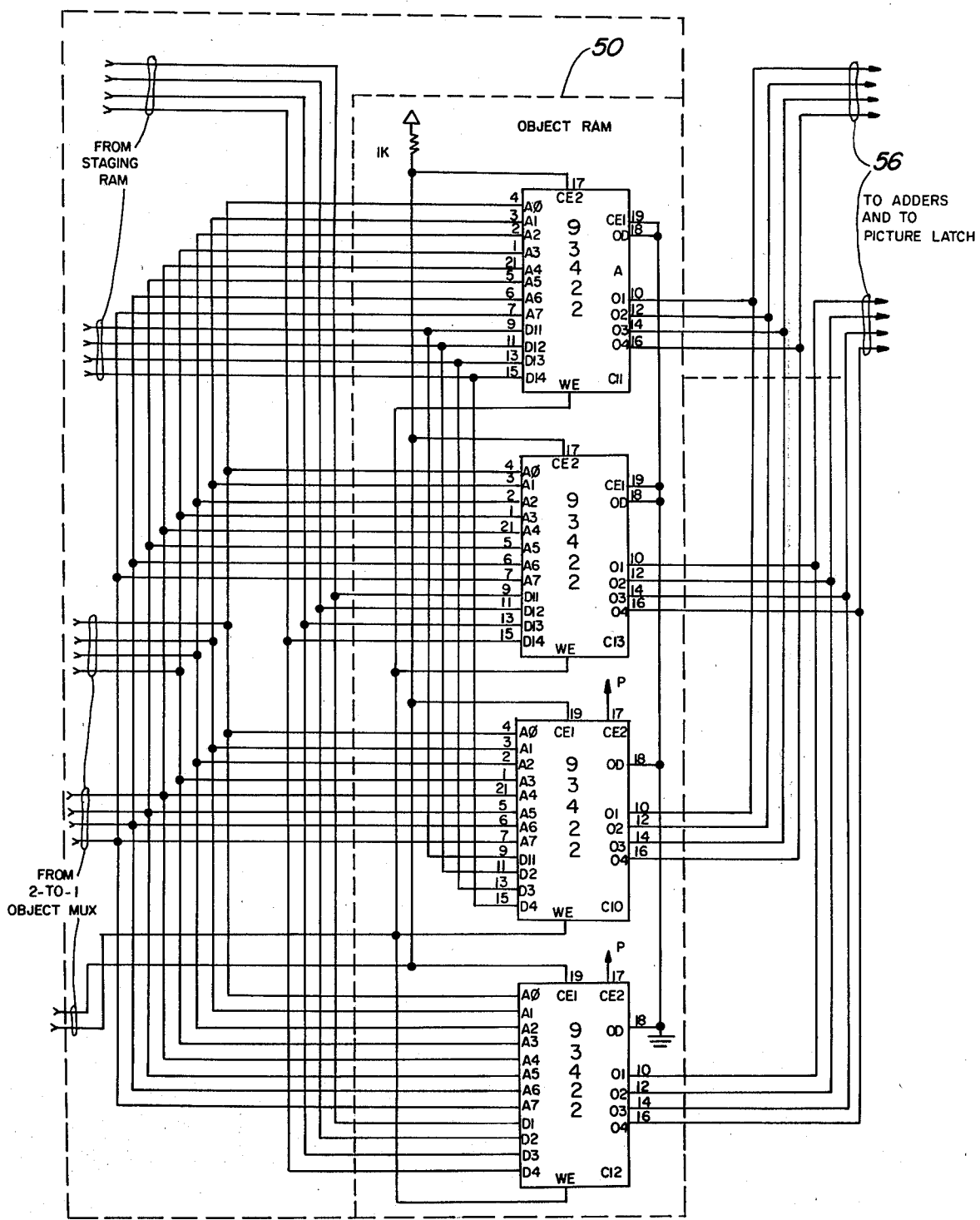
FIGS. 4A and 4B show a circuit diagram of a specific construction of the object section shown as a logical subsection in FIG. 3.
Figure 4B:
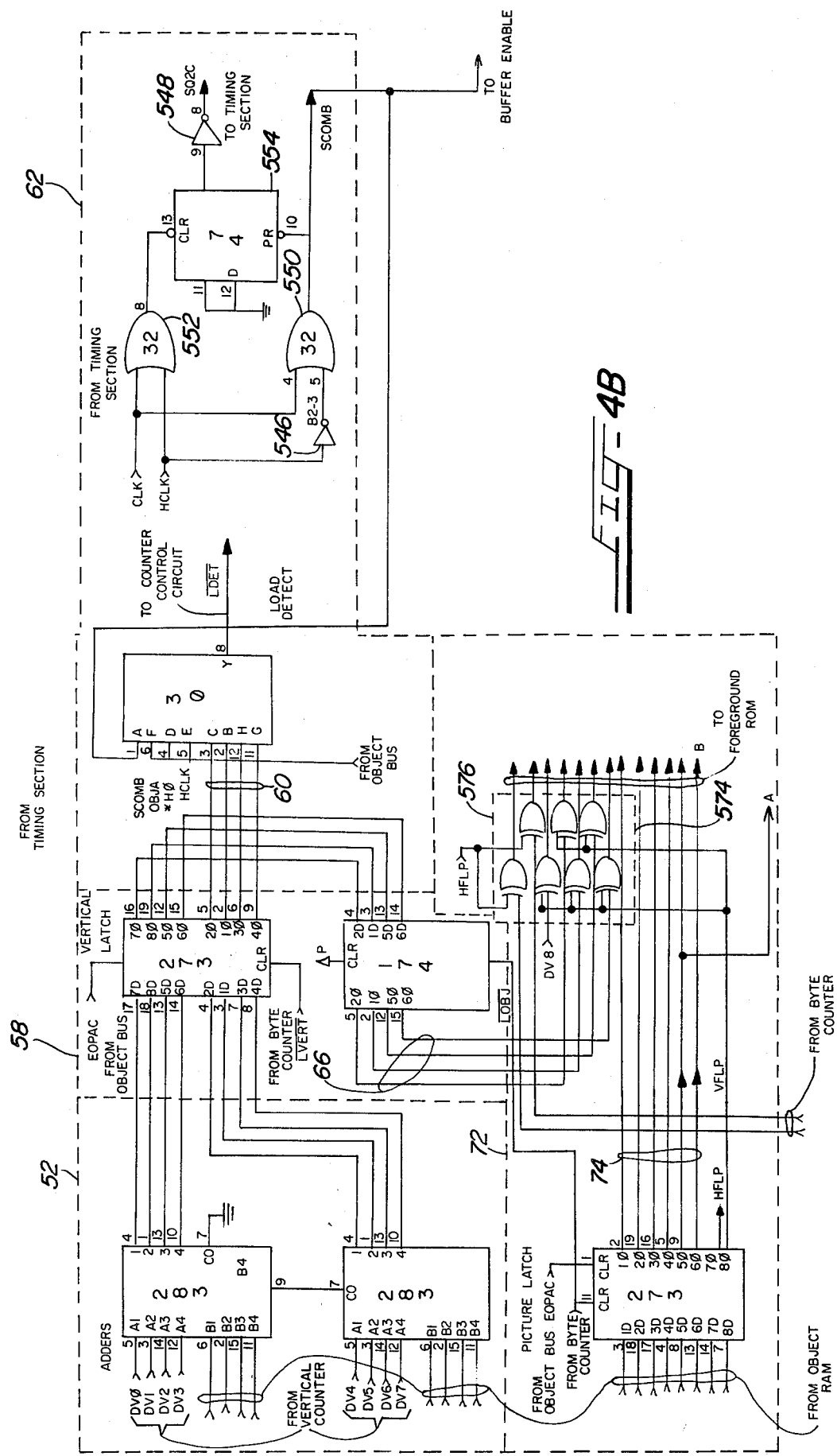

An object section 20 which provides storage and readout for object packages is shown in the logic diagram of the foreground generator 10, FIG. 3, and the circuit diagram of a specific construction of the object section, FIG. 4. The object packages are stored in an object RAM 50. Each object package comprises four bytes of information. The first byte of the package contains a starting vertical position, the second byte contains a picture number and an HFLP and a VFLP indicator, the third byte contains a starting horizontal position and the fourth byte is a blank byte which may be used by the programmer as some form of status byte. The fourth byte does not affect the displayed image in any way. Each byte comprises eight bits of data.

The object RAM 50 contains the data describing the location on the screen of each of the foreground objects.

In the specific construction the object RAM 50 comprises four 256×4 Fairchild 93422's addressed in pairs. A read at a single address location thereby causes the RAM to output one byte of data. Four sequential address locations constitute the data for a single object so that the specific construction can store 128 objects at any time. The present invention also encompasses other constructions which may have a greater or lesser number of objects than 128 and use more or less than eight bytes of storage per object.

An object control section 22 in the foreground generator 10 which provides control for reading object packages out of the object RAM 50 is shown in the logic diagram, FIG. 3, and the circuit diagram of a specific construction, FIG. 5. An object address counter 52 in the object control section is a nine bit counter which addresses the object RAM locations. This counter is set to zero at the start of every horizontal scan line.

The object address counter starts at the address of the first object package and counts in steps of 4 in order to determine from the vertical position byte of each package whether an object is to be loaded into one of a pair of RAM buffers 54 and 55 during the current scan line.

The most significant bit of the nine bit vertical counter may be used as a frame counter to count whether the frame is odd (0 to 239.5) or even (256 to 495). The vertical counter will thereby be an eight bit counter for each frame which counts downward starting from zero at the top of the screen. The vertical position in each package, however, is specified in the object RAM 50 by counting lines upward starting from zero at the bottom of the screen, as the screen is normally viewed.

Testing to determine whether an object is to be placed in a buffer may therefore be accomplished by adding the vertical counter contents to the vertical position byte contents from the object RAM 50. When the two eight bit quantities are added, the four most significant bits become "ones" 16 scan lines before all eight bits become "ones." This condition occurs once in the even frame and once in the odd frame. A test for all "ones" in the four most significant bits therefore permits the object to be placed in one of the buffers 54 or 55 during drawing of 16 horizontal lines before the object's lowest horizontal position line is drawn.

Addition is performed by an adder 53 in an object section 20 which is fed by the least significant eight bits 57 from the vertical counter and the output 56 of the object RAM 50 which comprises one of the starting vertical position bytes. The adder outputs into a vertical latch 58 which is clocked by signals on an LVERT* line and cleared by EOPAC pulses from the object address counter 52. The vertical latch 58 in turn outputs the four most significant bits 60 into a load detect circuit 62. The load detect circuit, which is a NAND gate in the specific construction illustrated in FIG. 4, enables a counter control circuit 65 when the load detect's input is all "ones," emitting a low logic signal on an LDET* line 64. The "*" in "LDET*" and "LVERT*" corresponds to the superior horizontal lines in the figure and indicates that a high logic signal is normally carried on that line. Additional inputs originating from the timing section 14 and the object address counter 52 gates the load detect signal for 25 ns. at the end of alternate HCLK pulses, as will be described.

Figure 6:
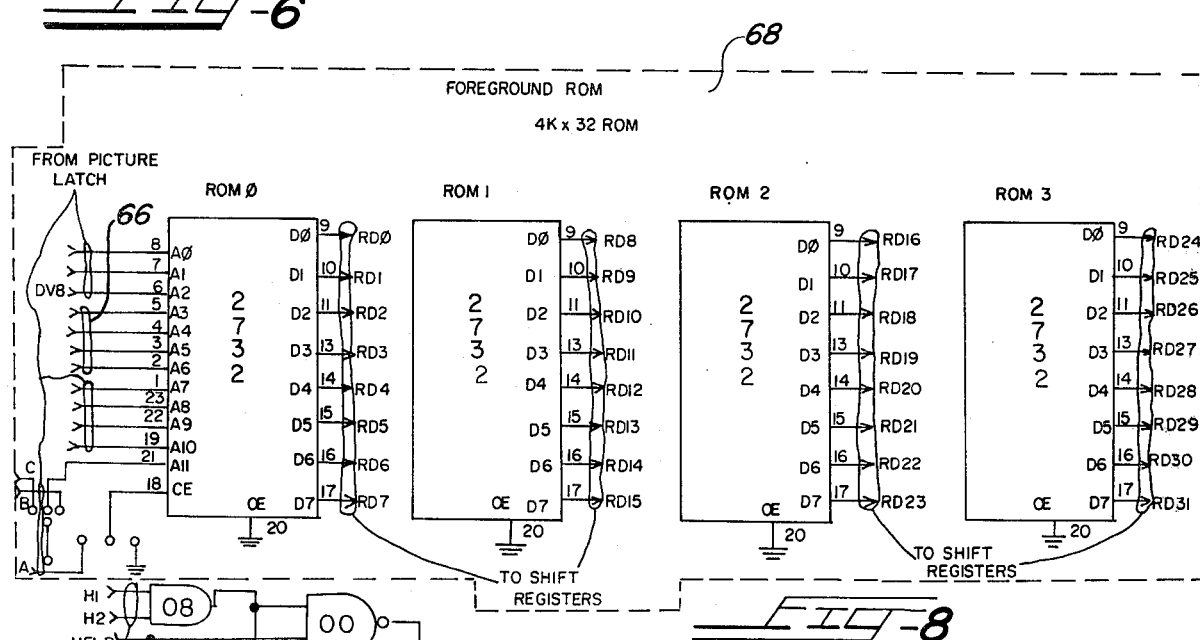
FIG. 6 is a circuit diagram of a specific construction of the foreground ROM shown as a logical block in FIG. 3.

FIG. 6 is a circuit diagram illustrating a specific construction of the foreground ROM 68. The four least significant bits 66 from the vertical latch 58 output address terminals A3 through A6 of the foreground ROM 68, and are incremented by one unit at the start of each horizontal line. Terminals A3 through A6 thereby point to successive groups of eight addresses in the foreground ROM. Each group represents data for one horizontal line of a picture.

The counter control circuit 65 is an object control section 22, illustrated in the circuit diagram, FIG. 5, is used to control the frequency and increment size of the object address counter 52. At the start of each horizontal scan the control circuit causes the object address counter to count in 200 ns. steps of 4. When the load detect circuit 62 determines that an object has to be loaded into the buffer it outputs a low on the LDET* line 64 to the counter control circuit, as already described. The counter control circuit 65 switches the count sequence of the object address counter to steps of 1 so that successive bytes of data may be retrieved from the object RAM 50. At the same time the time between steps is increased to 800 nanoseconds to provide time for each object to be loaded into the buffer. The slower counting rate obviates the possibility that the hardware might attempt to load a second object into the buffer before loading of the first one is complete. Once an object has been loaded into the buffer, the counting rate increases to provide for 200 nanosecond steps of 4.

Figure 7:
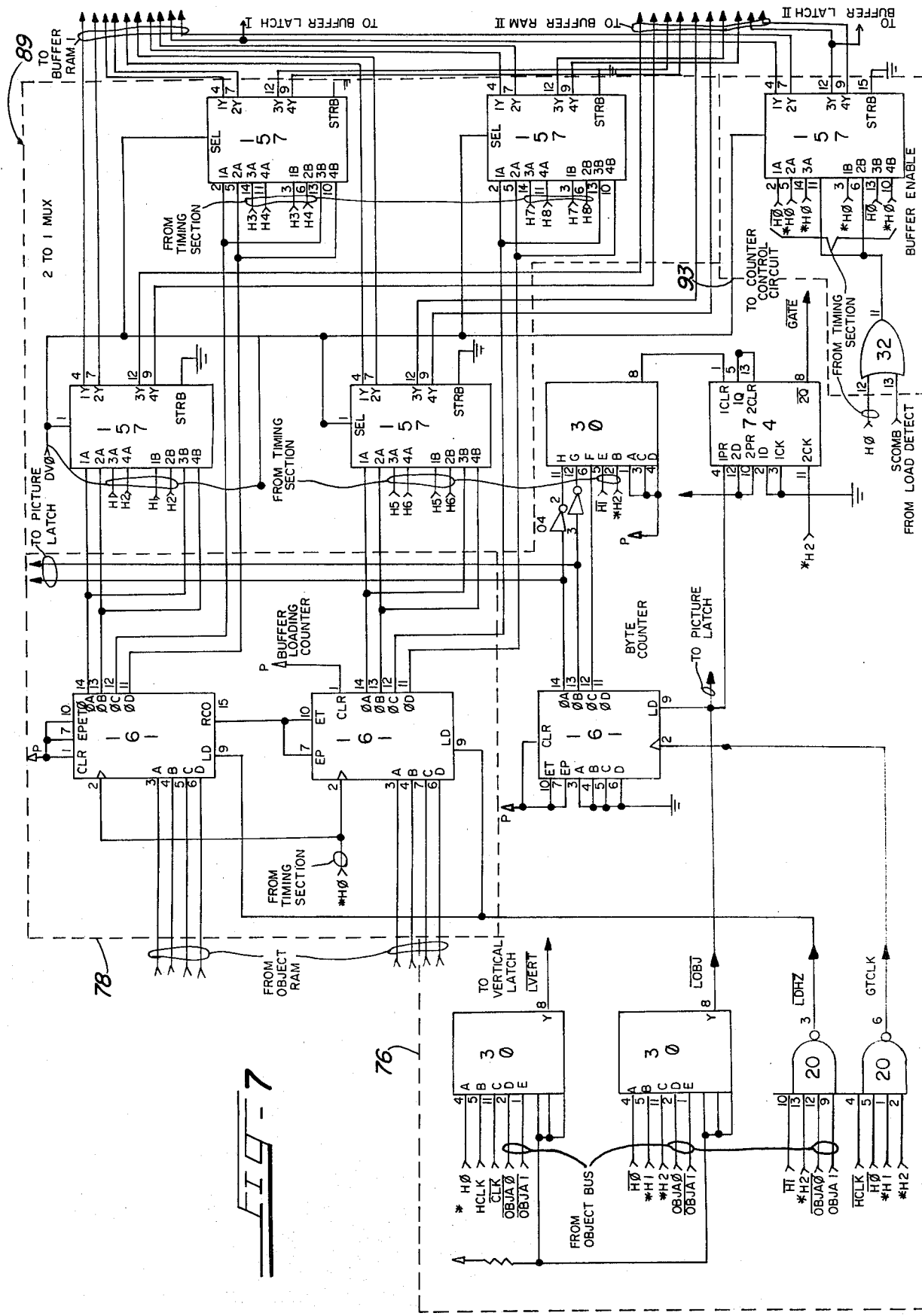
FIG. 7 is a circuit diagram of a specific construction of the object loading section shown as a logical subsection in FIG. 3.

When the object address counter 52 begins to count in steps of 1 the second byte to come out of the object RAM 50 is the picture number of the object being loaded into the buffer. The picture number is latched into a picture latch 72 by an LOBJ* signal generated from signals from the object address counter 52 on an OBJ bus 73, as will be described. The picture number now comprises the upper address lines 74 to the foreground ROM 68. The upper address lines 74 address the block of memory where the representation of the particular picture corresponding to the picture number is stored. A byte counter 76 is an object loading section 23, having a specific construction as illustrated in the circuit diagram, FIG. 7, is also enabled by the counter control circuit 65 when the picture number is latched. The byte counter addresses the two least significant digits of the foreground ROM, as shown in FIG. 4.

Count 512 in the object address counter is transmitted as a low on an EOPAC line in the OBJ bus 73, as shown in FIG. 5, to clear the picture latch 72. The latch is then enabled at the start of each horizontal scan when the EOPAC line goes high.

A flip-flop 77 in the object address counter outputs on a START line to reset the object address counter. The 634th count from the horizontal counter 32 is transmitted as a low to the flip-flop clear pin 77-1, causing the START line to go low. It will be recalled that the 634th count occurs at the end of horizontal blanking. As the horizontal counter starts counting out the next line, the clear pin 77-1 goes high and flip-flop 77 is enabled. The low on the START line resets the object address counter to zero, as may be seen from FIG. 5.

In the particular construction illustrated in FIG. 6 the foreground ROM was assembled from four Texas Instruments, Inc. 2732 ROM's. The four 4K $\times$ eight-bit ROM's are simultaneously addressed to provide a 4K $\times$ 32 bit memory. Another contruction of the embodiment may use 2764 ROM's to provide an 8K $\times$ 32 bit memory.

After the picture number is latched, the address counter 52 picks the third byte, the horizontal position byte, out of the object RAM 50. The horizontal position and successive bytes are loaded into an eight-bit buffer loading counter 78 during an approximately 3.2 microsec. interval, the time required to scan 32 pixels. During the loading the counter is clocked at one-half the pixel rate by rises on the line carrying the least significant count from the horizontal counter.

The byte counter 76 meanwhile counts out bits corresponding to one horizontal line of the picture stored in the foreground ROM 68 causing the ROM to read out the corresponding data. The count is from 0 to 3, addressing the two least significant digits of the ROM address. Counting is at the 800 ns. rate; the counter clears on the fourth count.

The third most significant digit of the ROM address is addressed by a DV8 line from the vertical counter which indicates whether the coming display is for an odd or even frame. ROM picture information for each picture is in the form of a set of words for one frame followed by a set of words for the second frame.

Figure 8:
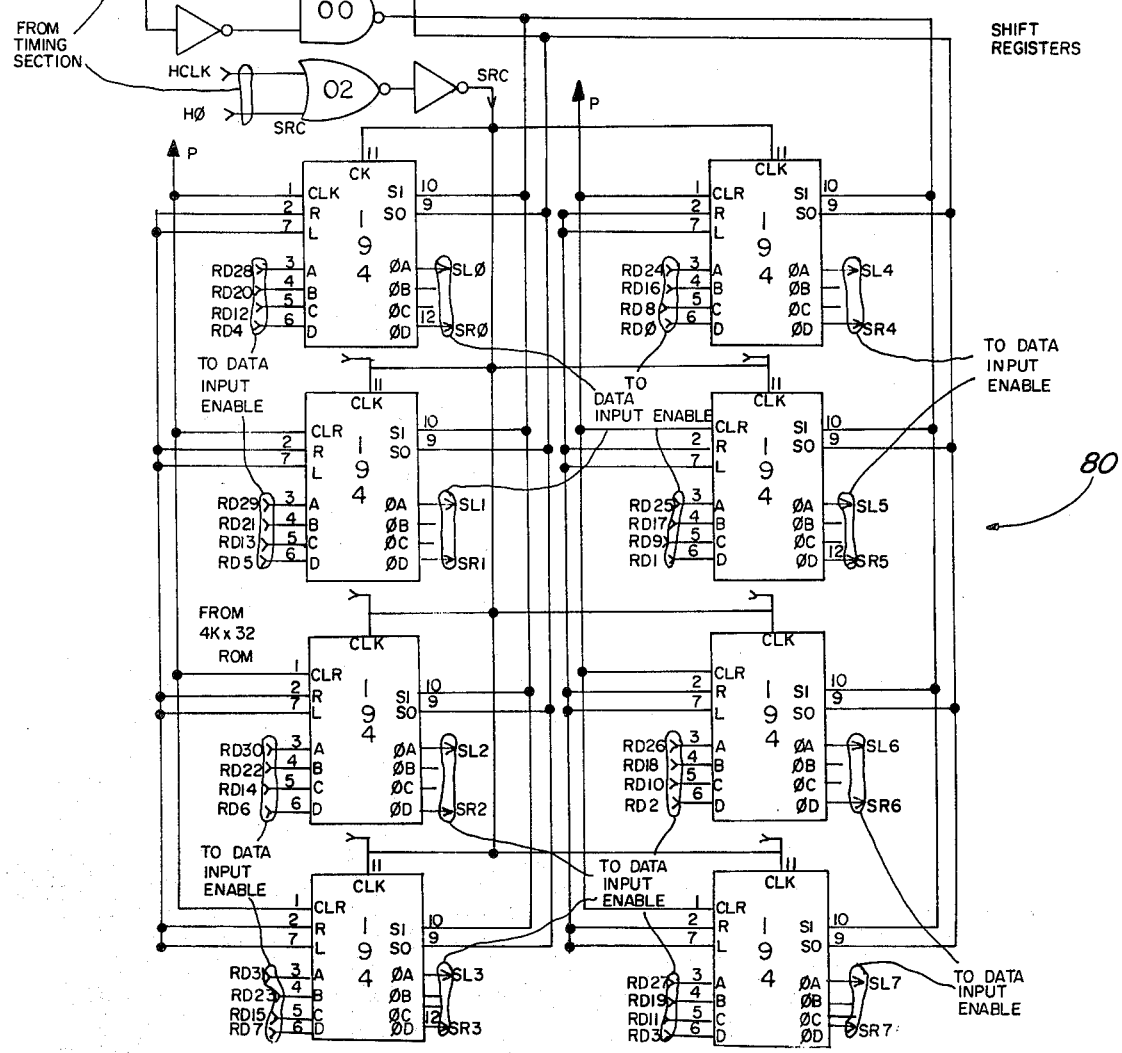
FIG. 8 is a circuit diagram of a specific construction of the shift register shown as a logical block in FIG. 3.

The data from the ROM 68 is read out in 32 bit words. Each word is first loaded into a set of shift registers 80. A specific construction of the shift registers is illustrated in FIG. 8. The word is shifted bit-by-bit through one of a pair of flip multiplexers 82, 83 and then through one of a pair of data input enable multiplexers 84, 85, which may have a specific construction as indicated in FIGS. 9A and 9B, illustrating a specific construction of a buffer section 23 of the foreground generator 10. The flip multiplexers implement a flip feature which will be described. The shift registers shift out the bits comprising the word at the same rate that the buffer loading counter 78 is counting. The bits are written into one of the buffer RAM's 54, 55 through buffer latches 86, 87. Picture information from the ROM is loaded into successive buffer locations, starting at the location specified by the horizontal position byte. The buffer loading counter 78 addresses the buffer RAM's through a 2-to-1 buffer multiplexer 89, shown in FIG. 7.

The shift registers 80, shift out each word, eight bits at a time. When all 32 bits have been shifted out to one of the buffers, the byte counter 76 increments the ROM 68 address and the next 32 bits are loaded into the shift registers. This process occurs a total of four times for one horizontal line of a single object, and a total of 128 bits of data are written into the buffer. Each pixel requires four bits of data; 32 pixels thereby comprise a single horizontal line representation of one object.

Each time data is loaded into one of the buffers 54, 55, data existing in the buffer is first read out and "OR"ed with the incoming data through one of a pair of OR-gates 90, 91; the result of the "OR"ing is then latched into the corresponding buffer latch and read back into the buffer. The "OR"ing operation is performed to insure that when picture background information consisting of all zeros is written into the buffer, any object data already existing in the buffer will not be erased.

Read/writes out of or into the buffers are controlled by a buffer enable 93 which also clocks the buffer latches 86, 87. The time comes to output the data from the buffers at the beginning of each horizontal line. The 2-to-1 multiplexer 89 switches the buffer address lines of the selected buffer to the output H0–H8 from the horizontal counter 30. Data coming out of the buffer is latched into one of a pair of data-out latches 94, 95 in an output section 25 of the foreground generator 10. A specific construction of the output section is illustrated in the circuit diagram, FIG. 10. As the horizontal counter counts from 0 to 511, the corresponding 512 bytes of data are sequentially read out of the buffer and zeros are written into the corresponding locations by holding all the data-in inputs to the buffer at zero and enabling the write mode, thereby flushing the buffer. The flushing operation is necessary because the buffer has to be cleared of old data (previous horizontal line) before new data (upcoming horizontal line) can be entered.

Data is latched into one of the data-out latches 94, 95 eight bits at a time. A four bit 2-to-1 A-multiplexer 98 switches between the least and most significant four bits at the pixel rate to provide a four-bit wide data stream 99. The four bit output of the A-multiplexer makes up one-half of the input to a four bit 2-to-1 B-multiplexer 202 in the control section 16, as may be seen by reference to FIGS. 11 and 12. Background information may make up the other half of the input, as will be described. Whether the background or foreground is selected is determined by the foreground information. If, for example, the foreground data has all zeros in the least significant three bits, as may be deducted from FIG. 12, then the background is displayed, otherwise the foreground is displayed.

Figure 11:
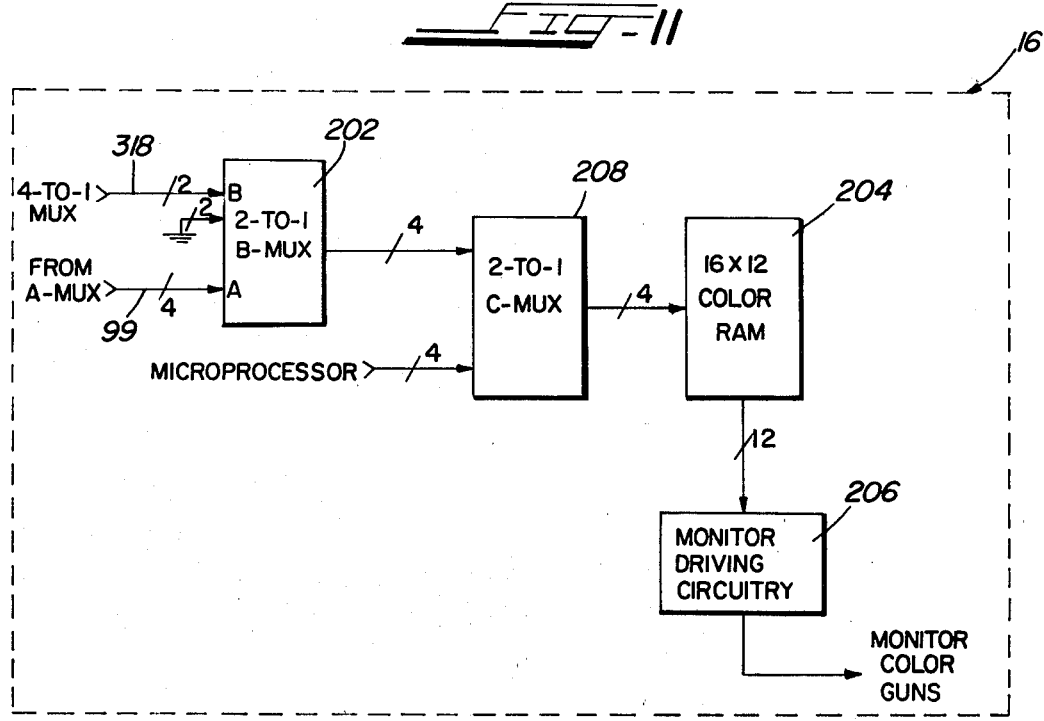
FIG. 11 is a functional block diagram of the control section shown as a block in FIG. 1.

The data from the B-multiplexer 202 indicates an address in a color RAM 204 as illustrated in FIGS. 11 and 12. The color RAM is a fast bipolar RAM comprising sixteen 12 bit words. Each 12 bit word can be altered by the programmer and corresponds to a color, thereby providing for 4096 colors, sixteen of which may be displayed at any one time. As the data in the foreground/background combination changes, different locations are addressed in the color RAM and corresponding data outputted to monitor driving circuitry 206. The B-multiplexer 202 communicates with the color RAM 204 via a C-multiplexer 208. The C-multiplexer is a quadruple 2-to-1 multiplexer which permits the microprocessor to address the color RAM directly. The data from the color RAM is converted to voltage levels by a resistor network and a current mirror comprising the monitor driving circuitry and interfaced to the color guns of a color monitor. The B-multiplexer 202 communicates with the color RAM 204 through a 2-to-1 C-multiplexer 208.

The background generator's construction and operation may be understood by reference to FIGS. 13 and 14. The background display comprises an array of 32 blocks width by 30 blocks high. Each block is 16 pixels wide and sixteen lines high. The background display, however, may control the pixels in pairs, thereby decreasing the resolution of the background as compared with the foreground. The display information for each pair of pixels then comprises two bits of data. A 1K×8 background RAM 302 may be used to store a set of data bytes which serve as pointers to the 32×30 array.

Each eight-bit byte of data in the RAM 302 points to an initial address in the 4K×8 background ROM 304. The particular background ROM then contains 256 different pictures which may be selected for display in each block of the array.

The background RAM 302 is addressed by a 2-to-1 background multiplexer 306. The background multiplexer, under control of the microprocessor, selects either the microprocessor address bus 308 or a ten-bit timing bus 210 from the timing section. The most significant bits on the timing bus are the fourth through seventh most significant bits of the vertical count, V3–V7; the remaining bits are the five most significant horizontal count bits, H4–H8, as shown in FIG. 13. The lower order horizontal and vertical counter bits are not used for addressing the background RAM thereby insuring that the address lines to the RAM change only 32 times during a horizontal line and 32 times for a vertical scan. That is, the address lines change only on every 17th horizontal count and every 9th vertical count. Thus, whenever the horizontal and vertical counts lie within the boundaries of a block, the same eight bits of data appear at the output of the background RAM 302.

The background RAM 302 output is latched into a background latch 312. The latched data becomes the upper address lines to the background ROM 304. Latching is clocked by NAND gate 313 on the third horizontal count after the RAM address changes in order to accommodate the access time of the RAM.

The three least significant vertical count bits and the fourth least significant horizontal count bit, in decreasing order, make up the low order address lines to the background ROM 304, also as shown in FIG. 14. The upper address lines thereby remain fixed while the low order lines count out bytes in the background ROM on every ninth horizontal count during the scan of a single line. The eight bits of data comprising one byte from the background RAM are then latched into a background out latch 314. The eight bits comprise data representing four pairs of pixels.

A 4-to-1 multiplexer 316 converts the eight bits into a two bit wide stream 318. The multiplexing is controlled by the second and third least significant horizontal counter bits, thereby providing a background resolution one-half that of the foregound.

The 2-bit stream 318 from the 4-to-1 multiplexer inputs to the alternate least significant input bits of the 2-to-1 B-multiplexer 202, as indicated in FIGS. 11 and 12. The output of the B-multiplexer addresses the color RAM through the 2-to-1 C-multiplexer 206, as already described. An alternative construction of the embodiment may use separate color RAM's for foregound and background. The second set of inputs of the C-multiplexer may be connected to the microprocessor, thereby providing a capability of direct microprocessor control of the color output from time to time.

The background RAM is partially updated from time to time during vertical blanking. Update is dictated by the play of the game. In normal play, only a very few background blocks will need to be altered and even a very slow microprocessor will have time to make the alterations during vertical blanking.

Data for the background RAM is taken off the microprocessor data bus by a bi-directional buffer 220 as will be described with reference to the foreground data.

A staging RAM 402 in a communications section 26 may be utilized for communication with the controlling CPU (which may be microprocessor based) as shown in FIG. 3. FIG. 15 is a circuit diagram of a specific construction of the communication section. Data is moved from the staging RAM to the object RAM 50 during every second vertical blanking time at intervals of approximately 1/30 sec. The total move takes eight horizontal lines times—approximately 508 microseconds in the specific construction described herein. During the move time a staging multiplexer 404 addressing the staging RAM selects a transfer counter 405 as input. An object multiplexer 406 addressing the object RAM simultaneously selects the transfer counter as input. Selection occurs at the beginning of the final eight vertical counts of the second vertical blank period. In the specific construction shown in FIG. 11 there is provision for the microprocessor to prevent the selection from occurring.

The transfer counter 405 steps through successive locations in the staging RAM 402; the data from the staging RAM is presented as input to the object RAM 50. A write enable signal is also generated by the transfer counter from the clock 30 and horizontal counter 32 and sent to the object RAM for each address. Because the address lines to each of the RAM's are identical, data is therefore transferred from the staging RAM 402 to the object RAM 50.

An interrupt signal sent to the microprocessor by the transfer counter 405 at the beginning of the transfer is used to inhibit the microprocessor from transferring data during the next 508 microseconds, during the time the staging RAM 402 is transferring its data.

The data transfer occurs between vertical counts 496 and 503. On vertical count 504 the staging multiplexer 404 switches and allows the microprocessor address bus to address the staging RAM. The object multiplexer 406, at the same time, allows the object address counter 52 to address the object RAM for readout purposes. The staging RAM is thereby available to be refreshed by the microprocessor except during vertical counts 496 to 503. Microprocessor data is input into the staging RAM through a bi-directional buffer 410 which may communicate with a microprocessor data bus 412.

The transfer counter 405 operates upon combinations of outputs from the horizontal and vertical counters. In the specific construction it is a nine bit counter. The five least significant bits are the five most significant horizontal count bits, as shown in FIG. 15. The three most significant bits are the three least significant vertical count bits. The counter thereby counts from zero to 1023 during the time required to draw four horizontal lines. Thus, in the specific construction, only one-half the available time is used for data transfer.

The staging RAM in FIG. 15 is constructed utilizing a pair of commercially available Intersil IM2114 RAM's with 1024×4-bit memories.

The flip feature is associated with the timing and foreground sections and controlled, in the specific construction, by the microprocessor. The underlying principle of the flip feature involves complementary, or backward, counting as a method for inverting and/or obtaining right-to-left reversal of the images presented on the screen. The embodiment described herein readily lends itself to complementary counting which, properly applied, merely reverses the horizontal and/or vertical scanning directions of the raster scan.

A FLIP command from the microprocessor inverts the entire picture, interchanging right-left and up-down, as required for a cocktail table game where two players are sitting opposite each other. The FLIP command affects the output of the timing section.

Figure 2:
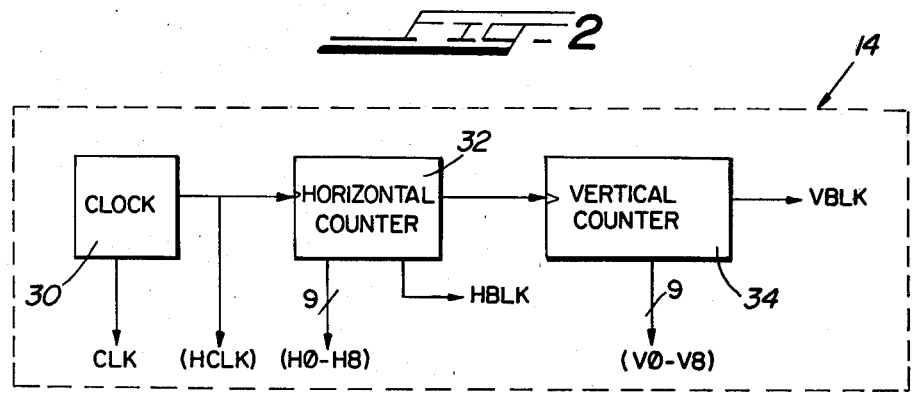
FIG. 2 is a functional block diagram of the timing section shown as a block in FIG. 1.

FIG. 16 is a more detailed schematic of the timing section than the simplified schematic in FIG. 2. The horizontal counter 32 of FIG. 2 is seen to comprise a horizontal first counter 500 and a FLIP horizontal logic circuit 502. The horizontal first counter 500 comprises a plurality of horizontal synchronous counters 510 feeding a horizontal logic circuit 512 as may be seen in the circuit diagram, FIG. 17. The horizontal counters are clocked by the leading edges of the positive 100 microsec. HCLK pulses from the system clock 30. The horizontal logic circuit emits a low on the 317* line on the 317th count, and a low on a 634* line on the 634th count. The 634* low is fed back to, and resets the horizontal synchronous counters 510, causing it to output lows on each of ten output lines, SH0 to SH9. The horizontal synchronous counters are thereby reset on every 635th count.

The horizontal synchronous counters 510 are clocked by the 100 ns. HCLK pulses generated by the system clock 30 and the D-type flip-flop 514. The HCLK pulses cause the counters to count on the output lines SH0-SH9 which are numbered in increasing order of significance.

The vertical counter 34 of FIG. 2 is seen to comprise a vertical first counter 520 and flip vertical logic 522, as shown in FIG. 17. The vertical first counter comprises a plurality of vertical synchronous counters 530 and a vertical logic circuit 532. The vertical logic circuit 532 emits a high (low) on the VBLK (VBLK*) line between vertical counts 239.5 and 255.5 and between vertical counts 495 and 511, as previously described. The vertical logic circuit also emits a low on a 511* line on count 511.

The vertical synchronous counters 530 are clocked by the SH9 line from the horizontal synchronous counters 510. The SH9 line goes high, as described, on every 635th count. The SH9 line is also the HBLK line to the monitor. The vertical synchronous counters are consequently advanced at the beginning of each HBLK period.

The vertical synchronous counters 530 are reset every 512th count by a low on the 511* line. The 511* low is a short pulse because the counters are reset substantially as soon as the 511* line goes low.

Circuit diagrams for the FLIP horizontal and vertical logic 502, 522 are also displayed in FIGS. 17A and 17B. The SH0 to SH5 outputs of the first horizontal counter 500 are fed to the input of a 74S174 D-type flip-flop 540 having a short set-up time approximating 5 ns. The outputs corresponding to inputs SH0 to SH2 are each fed to one of a first plurality of exclusive OR-gates 542. The second input to each of the exclusive OR-gates is a FLIP line from the microprocessor.

The output of each of the exclusive OR-gates 542 is fed to a different one of a triad of exclusive OR-gates 544, each also having the FLIP line as input. The outputs of the OR-gates 544 corresponding, respectively, to the inputs SH0 to SH2 are labeled *H0 to *H2.

The flip-flop 540 is triggered by an SQ2C* signal from the load detect circuit which is shown in FIG. 4. The SQ2C* signal, because of delays in a pair of inverters 546, 548 OR-gates 550, 552, and flip-flop 554, all shown in FIG. 6, resembles an HCLK signal delayed by about 15 ns. The *H0-*H2 signals in consequence, taking into account delays in the exclusive OR-gates 542, 544 are delayed about 50 ns. with respect to the SH0-SH2 signals. The *H0-*H2 signals are substantially unaffected by the state of the FLIP line. If FLIP is low, each exclusive OR-gate transmits the signals from SH0-SH2 unaffected. If FLIP is high then each exclusive OR-gate complements the signals and the resulting double complement leaves the signal unaffected.

Signals SH3-SH9 are clocked through the flip-flop 540 and then each is fed to a different exclusive OR-gate of the triad 556. The exclusive OR-gates output signals, respectively, H3-H9 which are delayed by about 25 ns. with respect to SH3-SH9. The FLIP line is a second input to each of the plurality of gates 556.

It should be evident from the preceding discussion that when FLIP is high the signals H3-H9 will be the complements of SH3-SH9. The time delays on each of the signals *H0-*H2 and H3-H9 will be comparable.

The signals *H0-*H2 are fed to a triad of inverters 564 to generate the complementary signals H0*-H2*.

The flip vertical logic 522 comprises an octal D-type flip-flop 566 and a set of nine exclusive OR-gates 568. The FLIP line is an input to each exclusive OR-gate. The vertical first counter 520 output V0-V7 is input to the flip-flop 566. The eight output lines from flip-flop 566 are each fed to a different one of the exclusive OR-gates 568 V4-V7 also feeding through adder 569. The V8 output from counter 520 is fed directly to the remaining one of the exclusive OR-gates 568. A set of output signals DV0-DV8 are thereby respectively generated through the flip-flop 566 and exclusive OR-gates 568 as shown explicity in FIG. 17.

The flip-flop 566 is clocked by the START line from the object address counter 52. The START line, it will be recalled, goes low just before the start of each horizontal line. It goes high on the first count from the counter control circuit which will be at the count of either the first or fourth horizontal pixel, depending upon whether an object is to be loaded. When START goes high the current vertical count V0-V7, is clocked into flip-flop 566 and through eight of the exclusive OR-gates 568, to generate the output signals DV0-DV7. The even or odd frame count bit, V8, is fed directly to the ninth of the exclusive OR-gates 568.

The DV0 output also inputs to an inverter 570 to generate a complementary output DV0*.

It should again be evident that when flip is high the signals DV0-DV8 and DV0* will be complemented. The adder 569 adds 16 to the complimented vertical count to compensate for the displacement introduced by VBLNK when counting backward from 511.

The logical description given so far of the operation of the embodiment did not depend in any manner upon the "direction" of counting of the horizontal and vertical counters 32, 34 except for the *H0-*H2 outputs of the horizontal counter which control timing logic. Conversely, since data is read out of the ROM's 68, 304 in 8-pixel groupings, the logic, other than control timing, is insensitive to the "direction" of counting of the *H0-*H2 horizontal counter outputs.

Thus, activation of FLIP by the microprocessor causes the significant horizontal and vertical counter bits to be complemented and will thereby cause the line buffer system to invert up-down and right-left in presenting its display.

An HFLP and a VFLP feature of the embodiment provide for inversion of a single object.

The VFLP and HFLP indicators are, respectively, the most significant bit and next most significant bit in the second byte of each object package. The HFLP and VFLP indicators are loaded into the picture latch 406 when an object is to be displayed. When either indicator is high the corresponding feature is enabled, as may be seen explicitly in FIG. 4.

The VFLP line provides one input of each of five exclusive OR-gates 574. The other input to each OR-gate is one of the lines carrying the four least significant bits from the vertical latch 58. The remaining one of the exclusive OR-gates 574 carries the even-odd frame count bit DV8. The outputs from the exclusive OR-gates 574 address terminals A2 to A6 of the foreground ROM as already described.

The foregoing description shows that activation of VFLP will present pictures from the foreground ROM 68 upside-down with respect to the normal presentation.

The HFLP line acts in an analogous fashion to the VFLP line. When the HFLP line is high it causes the pair of exclusive OR-gates 576 to complement the input to the two least significant address pins of foreground ROM 68. The four words comprising a line of a picture are thereby read out in backward order.

The HFLP high also selects the B-inputs from flip-muxes I and II, 82, 83. The B-inputs contain the output from shift registers 80 in inverted order from the A-outputs. As a result, the picture information will ultimately be read out backward, corresponding to right-left inversion, or reflection, of an individual picture.

It will, of course, be understood that modification of the present invention in its various aspects will be apparent to those skilled in the art, some being apparent only after study and others being a matter of routine design. For example, the use of more than two buffers is envisioned as a possible alternative embodiment of the invention. Clocks with shorter or longer periods than 50 ns. may also be used within the teachings of the invention. Further, the use of the particular circuit components described herein are not necessary features of the present invention. As such the scope of the invention should not be limited by the particular embodiment and specific construction herein described, but should be defined only by the appended claims and equivalents thereof.

What is claimed is:

1. A line buffer system for displaying a plurality of foreground objects and background on a monitor raster scan display screen used in a game to display a sequence of video pictures, each picture comprised of a plurality of parallel horizontal lines and each line being digitalized by division into adjacent pixels and each line being displayed on the display screen during active video scan, comprising:
   foreground memory means for storing object information in the form of blocks of digital data as foreground information in a foreground memory, each such block corresponding to a rectangular segment of the monitor screen displayable at a position on the screen that is selectable and changeable during the play of the game;
   background memory means for storing background information in the form of blocks of digital data in a background memory, such blocks corresponding to selectable and changeable rectangular locations on the monitor screen;
   buffer means;
   transfer means for transferring sufficient foreground information to comprise a horizontal line on the monitor screen from said foreground memory means to said buffer means during active video scan of a picture containing said line, but prior to the time active video scan of said line on the screen has begun;
   control means including means capable of controlling the intensity of the raster display in accordance with said data in said foreground memory means and said background memory means; and
   foreground output means for outputting said foreground information corresponding to said line from said buffer means in the form of a foreground data stream transmitted to said control means.

2. A line buffer system according to one of claim 1 wherein said foreground and background memory means are read only memories.

3. A line buffer system according to claim 2 wherein said foreground read only memory has a capacity substantially equal to 4,096×32 bits.

4. A line buffer system according to claim 2 wherein said background read only memory has a capacity substantially equal to 4,096×8 bits.

5. A line buffer system according to one of claim 1 and wherein said buffer means comprises a pair of random access memories, alternately refreshed by said transfer means.

6. A line buffer system according to claim 1 wherein said transfer means comprises:
   object means for storing object package information referring to objects in said foreground memory means;
   shift register means for transferring foreground data corresponding to said object package information from said foreground memory means to said buffer means;
   background means for storing background package information referring to blocks in said background memory means;
   background output means for transforming said background package information into a background data stream, wherein said background data stream comprises binary data for said line by reading said background package information from said background memory means during the display of said line.

7. A line buffer system according to claim 6 wherein said foreground output means includes multiplexers and timing signals for reading said foreground data stream out of said buffer means and for combining said foreground and background data streams into a single data stream, and means for applying said single data stream to said control means.

8. A line buffer system according to one of claims 1 and 6 wherein said control means includes color RAM means addressed by the data in at least one of said data streams to provide an output representing color, converting means for converting digital data output from said color RAM to analogue signals, and means for controlling the color and intensity of pixels in the raster display in response to said output.

9. A line buffer system according to one of claim 1 further characterized by picture flip means for inverting an entire picture with respect to one of a pair of axes parallel to and perpendicular to said horizontal lines.

10. A line buffer system according to one of claim 1 further characterized by object flip means for inverting at least one object representation with respect to an axis.

11. A line buffer system according to claim 6 wherein said transfer means includes:
microprocessor means for generating said object package information;
bus means connected to said microprocessor means for carrying said object package information;
staging means, connectable to said bus means by said microprocessor means at random times during the display of a sequence of video pictures, for temporarily storing said object package information carried on said bus means; and
moving means operably connected to said staging means and said object means for moving said object package information from said staging means to said object means without interfering with said microprocessor means generation of said object package information.

12. A line buffer system according to claim 11 wherein said moving means moves said object package information at substantially regular intervals during display of the sequence of video pictures.

13. A line buffer system according to claim 12 wherein the substantially regular intervals are spaced by approximately 1/30 of a second.

14. A line buffer system according to claim 12 wherein said moving means moves said object package information during a time of the order of 500 $\mu$secs.

15. A line buffer system according to claim 11 wherein said moving means inhibits said microprocessor means from connecting said staging means to said bus means while moving said object package information from said staging means to said object means.

* * * * *